(12) United States Patent
Lin et al.

(10) Patent No.: US 7,593,572 B2
(45) Date of Patent: Sep. 22, 2009

(54) INK-PARSER-PARAMETER OPTIMIZATION

(75) Inventors: Zhouchen Lin, Beijing (CN); Yantao Li, Beijing (CN); Yu Zou, Beijing (CN); Xianfang Wang, Beijing (CN); Jian Wang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 723 days.

(21) Appl. No.: 11/315,635

(22) Filed: Feb. 9, 2006

(65) Prior Publication Data

US 2007/0183664 A1    Aug. 9, 2007

(51) Int. Cl.
*G06K 9/00*    (2006.01)
(52) U.S. Cl. ...................................... 382/177
(58) Field of Classification Search ........................ None
See application file for complete search history.

(56) References Cited

U.S. PATENT DOCUMENTS

| | | | | |
|---|---|---|---|---|
| 5,235,653 A | * | 8/1993 | Nakano et al. .............. | 382/175 |
| 5,265,171 A | * | 11/1993 | Sangu ......................... | 382/177 |
| 5,793,891 A | * | 8/1998 | Takahashi et al. ........... | 382/228 |
| 6,671,403 B1 | * | 12/2003 | Takasu et al. ............... | 382/187 |
| 2003/0086612 A1 | * | 5/2003 | Hullender .................... | 382/187 |
| 2003/0215145 A1 | * | 11/2003 | Shilman et al. ............. | 382/195 |

* cited by examiner

*Primary Examiner*—Matthew C Bella
*Assistant Examiner*—Alex Liew
(74) *Attorney, Agent, or Firm*—Lee & Hayes, PLLC

(57) ABSTRACT

Ink-parser-parameter optimization may be performed via parallel processing to accelerate searching for a set of optimal ink-parser parameters. Evaluators may parse pages of ink notes with different groups of parameters and may compute corresponding values for evaluation functions. Separate evaluation functions may be defined for the following types of ink-parker parsing engines: writing parser, writing/drawing classification, table detection, and list detection. A searcher may perform a grid-searching algorithm or a genetic algorithm to generate groups of parameters and may then pass the parameters to available evaluators for evaluation until evaluation-function values for a group of parameters satisfy a convergence condition.

12 Claims, 9 Drawing Sheets

|  |  | mth Labeled Object ($m=1,...,M$) | Non-$k$th-type Component in the labeled results |
|---|---|---|---|
|  |  | $p$th Component of type $k$ ($p=1,...,P_m$) |  |
| $n$ th Parsed Object ($n=1,...,N$) | $q$th Component of type $k$ ($q=1,...,Q_n$) | $L^k_{nqmp}$ | $L^k_{nq\phi}$ |
| Non-$k$th-type Component in the parsed results |  | $L^k_{\phi mp}$ | $L^k_{\phi\phi}$ |

Figure 7

|  |  | mth Labeled Object ($m=1,...,M$) | Non-$k$th-type Component in the labeled results |
|---|---|---|---|
|  |  | the set of all the Components of type $k$ |  |
| $n$th Parsed Object ($n=1,...,N$) | the set of all the Component of type $k$ | $L^k_{nm}$ | $L^k_{n\phi}$ |
| Non-$k$th-type Component in the parsed results |  | $L^k_{\phi m}$ | $L^k_{\phi\phi}$ |

Figure 8

|  |  | mth Labeled Writing Paragraph | Non-writing word |
|---|---|---|---|
|  |  | pth word |  |
| nth Detected Writing Paragraph | qth word | 2* (number of common strokes) / (number of total strokes of two words) | 2* (number of common strokes) / (number of total strokes of two sets) |
| Non-Writing word | | 2* (number of common strokes) / (number of total strokes of two sets) | 2* (number of common strokes) / (number of total strokes of two sets) |

Figure 9

|  |  | mth Labeled Writing Paragraph | Non-writing line |
|---|---|---|---|
|  |  | pth line |  |
| nth Detected Writing BParagraph | qth line | 2* (number of common strokes) / (number of total strokes of two lines) | 2* (number of common strokes) / (number of total strokes of two sets) |
| Non-Writing line | | 2* (number of common strokes) / (number of total strokes of two sets) | 2* (number of common strokes) / (number of total strokes of two sets) |

Figure 10

|  | mth Labeled Writing Paragraph | Non-writing |
|---|---|---|
| nth Detected Writing Paragraph | 2* (number of common strokes) / (number of total strokes of two paragraphs) | 2* (number of common strokes) / (number of total strokes of two sets) |
| Non-writing paragraph | 2* (number of common strokes) / (number of total strokes of two sets) | 2* (number of common strokes) / (number of total strokes of two sets) |

Figure 11

|  | mth Labeled Stroke | Non-stroke |
|---|---|---|
| nth Classified Stroke | 1: if the two strokes are identical and their writing/drawing attribute are the same; 0: otherwise. | 0 |
| Non-stroke | 0 | 1 |

Figure 12

|  |  | mth Labeled Table | Non-frameline |
|---|---|---|---|
|  |  | Set of framelines |  |
| nth Detected Table | Set of framelines | 2 * (total length of all common framelines) / (total length of two sets of framelines) * exp ( 2 * number of common bounding frame strokes / number of total bounding frame strokes − 1 ) | 2* (number of common strokes) / (number of tota strokes of two sets) |
|  | Non-frameline | 2* (number of common strokes)/ (number of strokes of the two sets) | 2* (number of common strokes) / (number of total strokes of two sets) |

Figure 13

|  |  | mth Labeled Table | Non-Cell Conten |
|---|---|---|---|
|  |  | pth cell content |  |
| nth Detected Table | qth cell content | min( ( 2* (number of common strokes) / (number of total strokes of two sets) ), (2*common area of (cell content bounding box of labeled table, cell content bounding box of detected table) / sum of the area of the two bounding boxes ) ) | 2* (number of common strokes) (number of total strokes of two sets ) |
|  | Non-Cell Content | 2* (number of common strokes)/ (number of total strokes of two sets) | 2* (number of common strokes) (number of total strokes of two sets) |

Figure 14

|  |  | mth Labeled List | Non-Bullet |
| --- | --- | --- | --- |
|  |  | pth Bullet |  |
| nth Detected List | qth Bullet | min( ( 2* (number of common strokes) / (number of total strokes of two sets) ), (2*common area of (bullet bounding box of labeled list, bullet bounding box of detected list) / sum of the area of the two bounding boxes ) ) | 2* (number of common strokes) / (number of total strokes of two sets) |
|  | Non-Bullet | 2* (number of common strokes)/ (number of total strokes of two sets) | 2* (number of common strokes) / (number of total strokes of two sets) |

Figure 15

|  |  | mth Labeled List | Non-list item |
| --- | --- | --- | --- |
|  |  | pth list Item |  |
| nth Detected List | qth List Item | min( ( 2* (number of common strokes) / (number of total strokes of two sets) ), (2*common area of (list item bounding box of labeled list, list item bounding box of detected list) / sum of the area of the two bounding boxes ) ) | 2* (number of common strokes) (number of total strokes of two sets) |
|  | Non-List Item | 2* (number of common strokes)/ (number of total strokes of two sets) | 2* (number of common strokes) (number of total strokes of two sets) |

Figure 16

//www.w3.org/1999/xhtml">
INK-PARSER-PARAMETER OPTIMIZATION

BACKGROUND

Ink parsers are used for processing electronically represented handwritten text and/or drawings. Ink parsers are now performing increasingly sophisticated parsing operations, such as semantic parsing, which may include grouping ink strokes into words and lines, detection of lists, tables, flowcharts, annotations, and the anchoring of annotations. The output of an ink parser may include: hierarchical structures (e.g., words, lines, and/or paragraphs) of writing blocks, writing/drawing classifications, (unknown) drawing objects, flow charts, organization charts, tables, annotations, lists, and the like.

For an ink parser that handles handwritten text and drawings, multiple sub-parsers, also referred to herein as parsing engines, may be used. Each parsing engine may have a relatively large number of parameters, such as thresholds, scales, and weights of linear combination, that affect the accuracy of the parsing engines and the ink parser. Accordingly, setting the parser engines' parameters in such a way as to optimize the ink parser's performance is typically quite challenging.

BRIEF SUMMARY

This Brief Summary is provided to introduce a selection of concepts in a simplified form that are further described below in the Detailed Description. This Brief Summary is not intended to identify key features or essential features of the claimed subject matter, nor is it intended to be used as an aid in determining the scope of the claimed subject matter.

Ink-parser-parameter optimization may be performed via parallel processing to accelerate searching for a set of optimal ink-parser parameters. Evaluators may parse pages of ink notes with different groups of parameters and may compute corresponding values for evaluation functions. Separate evaluation functions may be defined for the following types of ink-parker parsing engines: writing parser, writing/drawing classification, table detection, and list detection. A searcher may perform any global optimization algorithm, e.g. a grid-searching algorithm or a genetic algorithm, to generate groups of parameters and may then pass the parameters to available evaluators for evaluation until evaluation-function values for a group of parameters satisfy a convergence condition.

BRIEF DESCRIPTION OF THE DRAWINGS

The foregoing Brief Summary, as well as the following Detailed Description, is better understood when read in conjunction with the accompanying drawings, which are included by way of example, and not by way of limitation, with regard to the claimed invention.

FIG. 7 shows a table that may be used for defining an evaluation function, in accordance with embodiments of the invention, when structural information is not used.

FIG. 8 shows a table that may be used for defining an evaluation function, in accordance with embodiments of the invention, when contextual or structural information is used.

FIG. 9 contains a table for evaluating word grouping in accordance with embodiments of the invention.

FIG. 10 contains a table for evaluating line grouping in accordance with embodiments of the invention.

FIG. 11 contains a table for evaluating paragraph grouping in accordance with embodiments of the invention.

FIG. 12 contains a table for evaluating writing/drawing classification in accordance with embodiments of the invention.

FIG. 13 contains a table for evaluating table frame lines in accordance with embodiments of the invention.

FIG. 14 contains a table for evaluating table cells in accordance with embodiments of the invention.

FIG. 15 contains a table for evaluating bullet points of a list in accordance with embodiments of the invention.

FIG. 16 contains a table for evaluating list items of a list in accordance with embodiments of the invention.

DETAILED DESCRIPTION

I. Introduction

As stated above, ink parsers are used for processing electronically represented handwritten text and/or drawings. Ink parsers are performing increasingly sophisticated parsing operations, such as semantic parsing, which may include grouping ink into words and lines, detection of lists, tables, flowcharts, annotations, and the anchoring of annotations. For example, if an application program supported by the ink parser knows that particular strokes correspond to a table, the application program can support rich editing operations such as a spreadsheet program's "sum" function.

The output of an ink parser may include: hierarchical structures (e.g., words, lines, and/or paragraphs) of writing blocks, writing/drawing classifications, (unknown) drawing objects, flow charts, organization charts, tables, annotations, lists, and the like. For an ink parser that handles handwritten text and drawings, multiple sub-parsers, also referred to herein as parsing engines, may be used. Each parsing engine may have a relatively large number of parameters, such as thresholds, scales, and weights of linear combination, that affect the accuracy of the engines. These parameters should typically be set to particular values in order to optimize performance of the ink parser.

Conventionally, most of the parsing-engine parameters are hand-tuned or chosen by statistics or experience. Since optimizing the accuracy of each engine is the goal, the optimal choice of each parameter may seem somewhat arbitrary.

Manually tuning the parsing-engine parameters of an ink parser to their optimal values is typically impracticable if the number of parameters is non-trivial (e.g., greater than approximately 3) and the data set of ink samples is relatively large. On the other hand, choosing the best values for only a subset of the parameters typically will not produce optimal parser performance. This renders a divide-and-conquer strategy (i.e., assigning optimal values to each parameter or small group of parameters, respectively) undesirable.

Conventional parameter-tuning approaches are typically time consuming and labor intensive and may not achieve optimal results. As such, improved techniques for optimizing parsing-engine parameters would be desirable.

II. Exemplary Operating Environment

Figure 1:
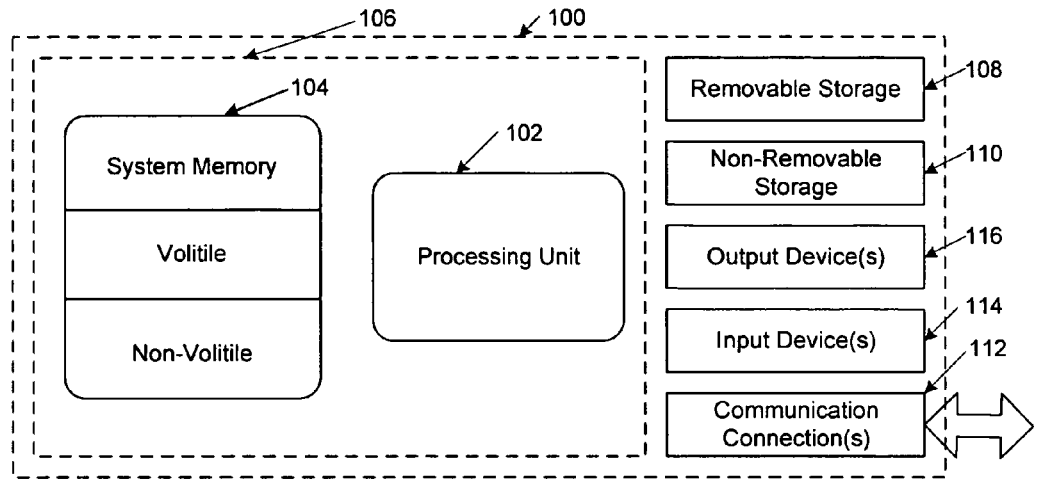
FIG. 1 shows an exemplary computer system within which embodiments of the invention may be implemented.

With reference to FIG. 1, an exemplary system for implementing embodiments of the invention includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106. Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by device 100. Any such computer storage media may be part of device 100.

Device 100 may also contain communications connection(s) 112 that allow the device to communicate with other devices. Communications connection(s) 112 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Device 100 may also have input device(s) 114 such as keyboard, mouse, pen, voice input device, touch input device, etc. Output device(s) 116 such as a display, speakers, printer, etc. may also be included. All these devices are well know in the art and need not be discussed at length here.

III. Overview of Ink-Parser-Parameter Optimization

Finding sets of parameters for parsing engines such that an ink parser's performance is optimized is typically a relatively time-consuming process, because for even one group of parameters (i.e., an individual of a population, as discussed in more detail below), it will take a significant amount of time to parse a significant number (e.g., hundreds) of pages of ink and evaluate the difference between the parsing results and the labeled results. Therefore, embodiments of the invention may include an ink-parser-parameter-optimization system, such as the system shown in FIG. 2. Such a system may perform parallel processing to accelerate searching for optimal parameters. Evaluators 202-1, 202-2 ... 202-N may parse pages of ink with different groups of parameters and compute corresponding values for one or more evaluation functions. A searcher 204 may run a searching algorithm to generate a number of groups of parameters and may then pass the parameters to available evaluators 202 for evaluation.

Figure 2:
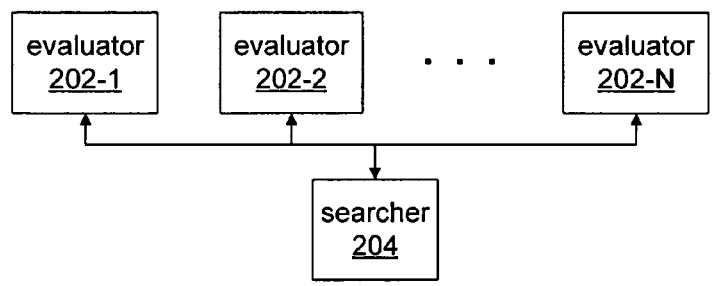
FIG. 2 shows an ink-parser-parameter-optimization system in accordance with embodiments of the invention.

The main workflow of the ink-parser-parameter-optimization system of FIG. 2 is as follows:

1. The searcher 204 generates groups of parameters and waits for evaluators 202 to indicate that they are available.
2. If an evaluator 202 finds itself idle, it may send a request to the searcher 204 for a group of parameters.
3. The searcher 204 sends a group of parameters to the evaluator 202.
4. The evaluator 202 parses pages of ink with the group of parameters and then calculates a value for the evaluation function.
5. The evaluator 202 sends the evaluation results to the searcher 204.
6. When the I groups of parameters have been evaluated, the searcher 204 may determine whether a convergence condition is satisfied. If so, the searcher 204 ends with an optimal group of parameters. Otherwise, the searcher 204 may generate additional groups of parameters based on the previously generated groups of parameters and their evaluation results, and again waits for clients' requests for groups of parameters to be evaluated.

As there may be many parsing and/or detection engines in the parser, and these engines may be assembled and disassembled arbitrarily according to different applications, the parameter tuning may happen sequentially engine-by-engine (i.e., to tune the parameters of an engine, the parameters of previous engines may be tuned to their optimal values and then fixed). To save time, the parsing results of previous engines at their fixed parameters may be saved.

As will be apparent to those skilled in the art, evaluators 202 may be executed on separate computing devices 100 relative to a computing device that executes searcher 204. Alternatively, evaluators 202 and searcher 204 may execute on the same computing device 100 in separate execution threads that are executed by one or more processing units 102.

Figure 3:
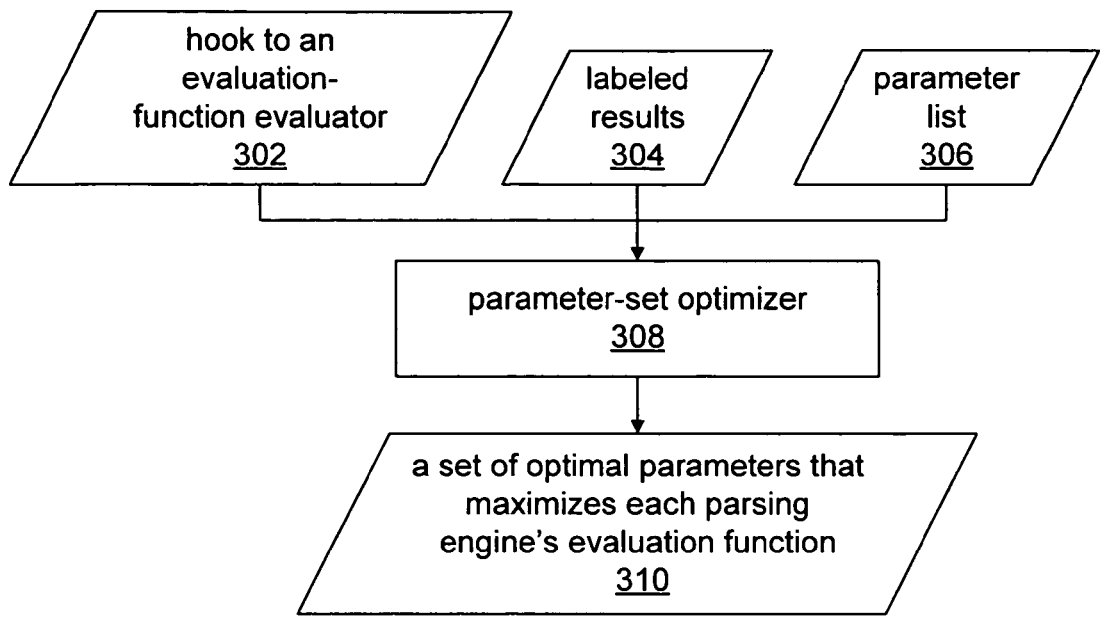
FIG. 3 is a data-flow diagram for a searcher in accordance with embodiments of the invention.

FIG. 3 is a data-flow diagram for a searcher 204 in accordance with embodiments of the invention. As shown in FIG. 3, inputs to a parameter-set optimizer 308 include: a hook to an evaluation-function evaluator 302, labeled results 304, and a parameter list 306. Based on these inputs and the grid searching and/or the genetic algorithms discussed below, the parameter-set optimizer 308 generates a set of optimal parameters that maximizes each parsing engine's evaluation function 310. Evaluation functions are discussed below for various parsing engines and/or detection engines (referred to as parsing engines for the sake of brevity).

Figure 4:
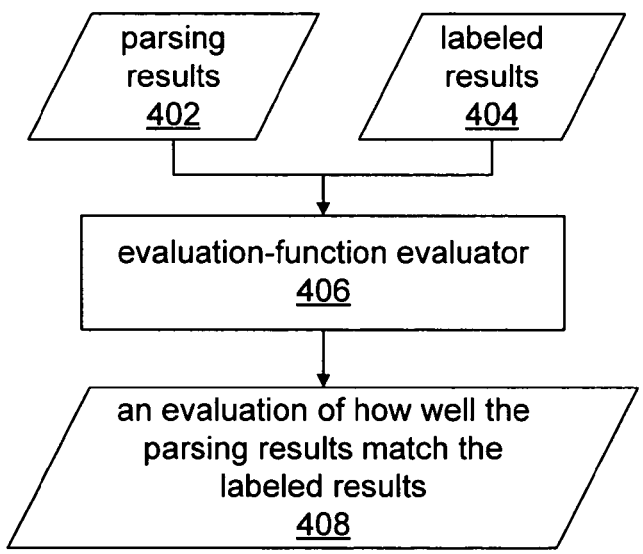
FIG. 4 is a data-flow diagram for an evaluator in accordance with embodiments of the invention.

FIG. 4 is a data-flow diagram for an evaluator in accordance with embodiments of the invention. As shown in FIG. 4, inputs to an evaluation-function evaluator 406 may include: parsing results 402 (i.e., the output of a parsing engine), and labeled results 404 (i.e., the ground truth of the expected parsing results that are manually labeled by the user or someone else who knows what the parsing results should be). Based on these inputs, the evaluation-function evaluator 406 evaluates an evaluation function (several of which are described below) to generate, as output, an evaluation of how well the parsing results match corresponding labeled results 408. The evaluation 408 may be a scalar number or may be expressed in any other suitable form.

Figure 5:
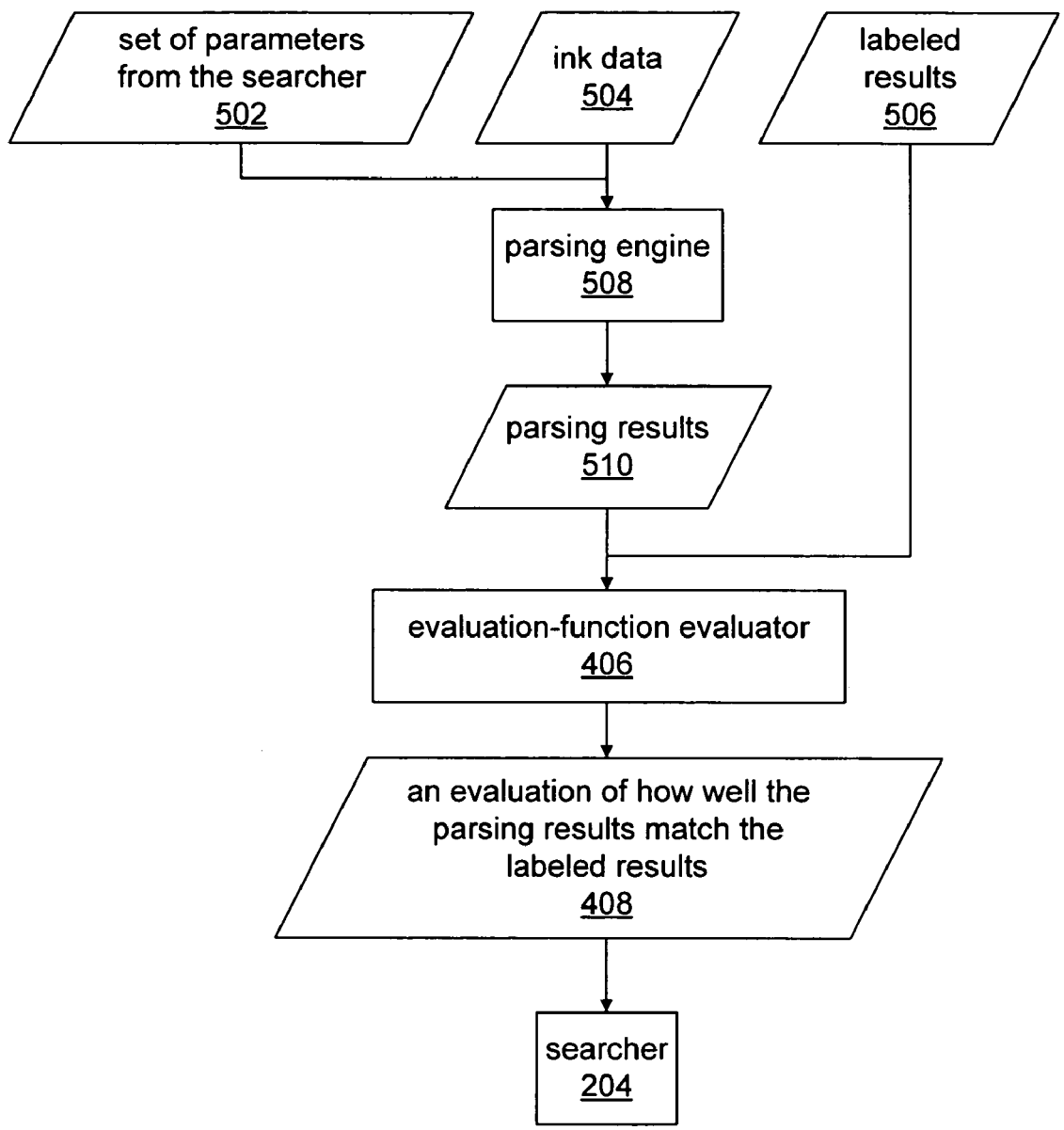
FIG. 5 shows data-flow associated with an evaluator in accordance with embodiments of the invention.

FIG. 5 shows data-flow associated with an evaluator 202 in accordance with embodiments of the invention. As shown in FIG. 5, inputs to a parsing engine 508 include: a set of parameters 502 from the searcher 204 and ink data 504 (e.g., data that specify handwritten ink strokes). Based on these inputs, the parsing engine 508 parses the ink data 504 to generate parsing results 510. The inputs to the evaluation-function evaluator 406 may include the parsing results 510 and the labeled results 506. Based on these inputs, the evaluation-function evaluator 406 uses an evaluation function to generate an evaluation of how well the parsing results 510 match the labeled results 506. Evaluation functions are discussed below for various parsing engines and/or detection engines (referred to as parsing engines for the sake of brevity). The evaluation 408 of how well the parsing results match the labeled results, which may be a scalar number or may be expressed in any other suitable format, is then sent to the searcher 204.

Figure 6:
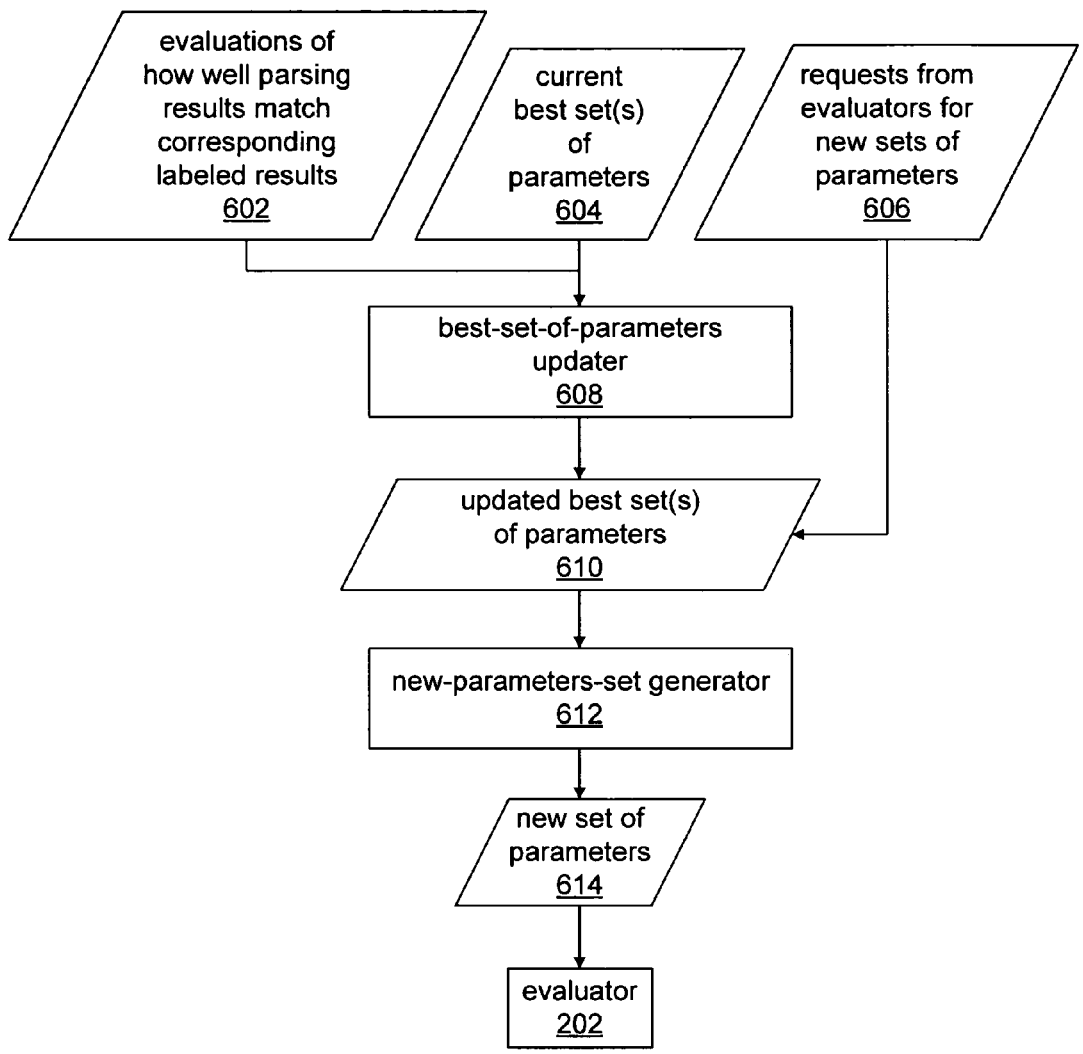
FIG. 6 shows data-flow associated with a searcher in accordance with embodiments of the invention.

FIG. 6 is a data-flow diagram for a searcher 204 in accordance with embodiments of the invention. As shown in FIG. 6, inputs to a best-sets-of-parameters updater 608 include: evaluations 602 of how well parsing results 510 match corresponding labeled results 506, and a current best set(s) of parameters 604. Based on these inputs, the best-set-of-parameters updater 608 generates an updated best set(s) of parameters 610, which, along with requests 606 from evaluators 202 for new sets of parameters, are input to the new-parameters-set generator 612. Based on these inputs, the new-parameters-set generator generates, if appropriate, a new set(s) of parameters 614 and sends the new set of parameters to an available evaluator 202 for evaluation. Operation of the best-set-of-parameters updater 608 and the new-parameter-set generator 612 are discussed in more detail below. As an example, when the grid searching algorithm is adopted, the current best set of parameters 604 is the set of parameters that makes the evaluation function smallest among all computed sets of parameters. The best-set-of-parameters updater 608 then compares the output of the evaluator 602 running with the current set of parameters with the current smallest value of evaluation function (which corresponds to the current best set of parameters 604), and keeps the set of parameters as current best set of parameters if that set of parameters results in smaller value of evaluation function (note that given a set of parameters, there is an output of the evaluator 602 running with that set of parameters.). Hence the best set of parameters is updated as depicted in FIG. 6 by the updated best set(s) of parameters 610. Then, suppose the currently searched parameter is the i-th parameter (note that the grid searching algorithm optimizes each parameter one by one), the new-parameter-set generator 612 generates a new set of parameters 614 with the i-th parameter being increased by a specified stepsize while the rest parameters are kept unchanged. However, if the i-th parameter reaches its upper bound, then the new set of parameters 614 is generated with the (i+1)-parameter being its lower bound while the rest parameters are chosen as their values in the updated best set(s) of parameters 610 (note that for grid searching, each parameter is allowed to vary in a given interval specified by a lower bound and an upper bound). If the i-th parameter is the last parameter, then the next parameter to be tuned is the first parameter, i.e. the parameter tuning process repeats, In this way, the new set of parameters 614 is generated. As another example, when the genetic algorithm is adopted, the current best sets of parameters 604 are those chromosomes (in the terminology of genetic algorithm, each set of parameters is called a chromosome.) that were updated in last iteration with the best chromosome (i.e. the set of parameters that results in the smallest value of the evaluation function up to date) being kept. In this example, the best-set-of parameters updater 608 is not triggered until the values of the evaluator 602 running with the current best sets of parameters 604 are computed. When the best-set-of-parameters updater 608 is triggered, it basically randomly selects one or two chromosomes in the current best sets of parameters 604 and applies the mutation or crossover operation on the chromosome(s) (to be detailed below) to generate a new chromosome. When the number of newly generated chromosomes reaches the specified population minus one (the remaining one is for the current best chromosome, see immediately below), the best-set-of-parameters updater 608 then replaces the current best sets of parameters 604 with the newly generated chromosomes and the current best chromosome. Thus the updated best sets of parameters 610 are obtained. Then the new-parameters-set generator 612 selects a chromosome in order from the updated best sets of parameters 610 and makes it a new set of parameters 614, until substantially all the chromosomes, except the current best chromosome (because it has been evaluated), are evaluated.

IV. Definition of Evaluation Functions

An evaluation function in accordance with embodiments of the invention may be such that, with the parameters maximizing the evaluation function, the engine's performance is optimized with respect to human examination. As such, the definition of an evaluation function should be similar to human intuition. As not all human intuition is easily describable, a good evaluation function may be relatively hard to define. Moreover, computation constraints may also dictate that the evaluation function executes efficiently, otherwise the execution time for thousands of iterations of parsing and function evaluation will be unacceptably long.

The preceding paragraph discusses parameters maximizing an evaluation function. As will be apparent to a person of ordinary skill in the art, parameters may minimize an evaluation function instead, depending on the definition of the evaluation function. Hereinafter, for the sake of brevity, we discuss only maximization of an evaluation function, even though either maximization or minimization of an evaluation function (depending on the definition of the evaluation function) may be performed in accordance with various embodiments of the invention.

The difference between parsing results and labeled results (i.e., the ground truth) lies in three aspects: grouping, structure, and attribute. Grouping difference refers to different grouping of the components. For example, "together" can also be grouped as "to", "get", and "her". Structural difference refers to different relationships among the components. For example, the set of frame lines for a table of the parsing results may be substantially the same as that of the labeled results, but the relationship of intersections between the frame lines may be different, resulting in different tables. Attribute difference refers to different attributes assigned to the same component. For example, a stroke can be labeled as either "writing" or "drawing", resulting in different writing/drawing classification results. An evaluation function in accordance with embodiments of the invention may reflect a difference in one or more of these three aspects. Embodiments of the invention may include a unified framework for defining evaluation functions.

V. Unified Framework for Defining Evaluation Functions

To evaluate the three aspects of difference, the correspondence between a component in the parsing results and a component in the labeled results is determined. Without determining such a correspondence, we will have difficulty in comparing the grouping, structural, and attribute difference between the two components. Unfortunately, in practice, the correspondence is usually ambiguous. For example, if "to", "get" and "her" is grouped incorrectly as "tog" and "ether", then it is ambiguous whether "tog" should match "to" or "get". On the other hand, a compulsory one-to-one correspondence (i.e. if a component A is decided to correspond to A' then both A and A' cannot correspond to another component) may not be appropriate because some component will not be assigned a corresponding component. For example, as "to" matches "tog", "get" must match "ether", then "her" does not have a match. To address these issues, we choose not to assign one-to-one correspondence between the components of the parsing and the labeled results. Instead, a likelihood is used to indicate how likely it is that components match each other. The likelihood may take the grouping, structure, and/or attribute into consideration. Then a total entropy may be computed to measure the closeness between the parsing and the labeled results. The approach begins with table filling (note that this table filling is conceptually distinct from "table detection" performed by an ink parser).

In accordance with embodiments of the invention, for each type of component in a semantic object, substantially all components of the type may be found.

When structural information is not used, a table, such as the table shown as FIG. 7 may be constructed. The table of FIG. 7 has M "large" columns (also referred to as M "groups of" columns) for the M labeled objects, and the mth "large" column has $P_m$ "small" columns (also referred to as "individual" columns) for the $P_m$ components in the mth object (FIG. 7 does not show M "large" columns and $P_m$ "small" columns for the sake of brevity). Similarly, The table of FIG. 7 has N "large" rows (also referred to as N "groups of" rows) for the N parsed objects, and the nth "large" column has $Q_n$ "small" rows (also referred to as "individual" rows) for the $Q_n$ components in the nth object (FIG. 7 does not show N "large" rows and $Q_n$ "small" rows for the sake of brevity). There is also an extra column and an extra row for other components that do not belong to the semantic object. Take the writing parser for example, which evaluates grouping accuracy of words, lines, and paragraphs, one may construct three separate tables, namely one table for words, one table for lines, and one table for paragraphs.

If contextual or structural information is used, the comparison may be done between sets of those components that belong to the same semantic object. The corresponding table to be filled is shown in the table of FIG. 8, where the table has M "large" columns for the M labeled objects, but the mth "large" column has only one "small" column for the set of components in the mth object. Similarly, the table has N "large" rows for the N parsed objects, but the nth "large" row has only one "small" row for the set of components in the nth object. For example, in list detection, the set of bullets may be used for comparison because their indent levels may be different.

Entries of the table of FIG. 8 may be filled as follows. Each entry may represent the likelihood (e.g., a value between 0 and 1) that the corresponding (sets of) components match each other. For example, the number $L_{nm}^k$ in FIG. 8 measures the likelihood that the set of type-k components of the nth parsed object matches that of the mth labeled object; while $L_{n\phi}^k$ is the likelihood of the set of components in the nth parsed object not belonging to its detected type. To compute the likelihood, various factors may be considered. The number or the total length of common strokes may commonly be used. Other factors may consider various characteristics of the semantic objects. However, the choice of factors may take the labeled information into account. For example, though the intersection relationship among the frame lines of a table may be considered for evaluation, as this information is hard to label, this factor may be dismissed when evaluating frame-line detection.

Note that in accordance with embodiments of the invention, $L_{n\phi}^k$, the last entry of a row in the table is clipped so that it does not exceed the maximum of other entries on the same row. Clipping of this type is performed because a particular type of component cannot match one that is not of the same type. One may clip it to the maximum of the row. Similarly, $L_{\phi m}^k$ does not exceed the maximum of the other entries in the same column either; while $L_{\phi\phi}^k$ is not smaller than any other entries in the last column or row, and clipping can solve such inconsistencies.

The likelihood should be zero if the two (sets of) components do not have common strokes.

An evaluation function may be defined by entropy based on the following principles: if a parsed component A is identical to a labeled component A', then the set of the likelihood of A and substantially all of the labeled components has the following two properties: (1) there should be only one non-zero likelihood indicating the matching is unambiguous; and (2) the non-zero likelihood should be 1, indicating the quality of matching is optimal.

If the likelihood is close to being uniformly distributed or the maximum likelihood is small, then the parsing result of A is not good. For the first property, the entropy is good at describing ambiguity.

Suppose the entries of the kth table is $T_{rs}^k$ (k=1, ..., K, r=1, ..., R; s=1, ..., S) (note that clipping of entries, as described above, should be performed before the entropy computation), the score $E^k$ of evaluating the kth component can be defined as:

$$E^k = \sum_{r=1}^{R} \max_j \{T_{rj}^k\}(1 - E_{row,r}^k / \ln S) + \sum_{s=1}^{S} \max_i \{T_{is}^k\}(1 - E_{column,s}^k / \ln R),$$

where $$E_{row,r}^k = -\sum_{s=1}^{S} \tilde{T}_{rs}^k \ln(\tilde{T}_{rs}^k)$$

is the entropy of the rth row and $$E_{column,s}^k = -\sum_{r=1}^{R} \hat{T}_{rs}^k \ln(\hat{T}_{rs}^k)$$

is the entropy of the sth column, and $$\tilde{T}_{rs}^k = T_{rs}^k / \sum_{j=1}^{S} T_{rj}^k,$$

$$\hat{T}_{rs}^k = T_{rs}^k / \sum_{i=1}^{R} T_{is}^k,$$

are the normalized probabilities along a row and a column, respectively. Note that $\max_j \{T_{rj}^k\}(\ln S - E_{row,r}^k)$ is large when the matching is good and is small when the matching is bad. Its maximum and minimum are lnS and 0, respectively.

If the entries of the rth row are all 0, i.e., there is substantially complete mis-detection or mis-classification, then $E_{row,r}^k = \log S$. A similar principle applies for columns.

The final evaluation score E can be defined as:

$$E = \sum_{k=1}^{K} w_k E^k,$$

where $w_k$ are weights.

VI. Detailed Definitions of the Evaluation Functions for Ink Objects

A. Writing Parser

Writing may be classified as belonging to one or more of three levels—word, line, and paragraph. For each level, a table may be constructed and filled in. Writing has a hierarchical structure. Words are components of lines, and lines are components of paragraphs. This hierarchical structure can cause some difficulties. For instance, paragraphs are compared based on their lines, which must be evaluated by their words. To simplify the problem, the three levels are viewed as groups of strokes and are evaluated by the number of common strokes. The definitions of the three tables are shown in FIGS. 9-11. FIG. 9 contains a table for evaluating word grouping in accordance with embodiments of the invention. FIG. 10 contains a table for evaluating line grouping in accordance with embodiments of the invention. FIG. 11 contains a table for evaluating paragraph grouping in accordance with embodiments of the invention.

B. Writing/Drawing Classification

Writing/drawing classification is performed to determine whether a stroke is writing (i.e., handwritten text) or drawing (i.e., a handwritten drawing other than text). Therefore, distinguishing between writing and drawing is relatively simple (compared to distinguishing between words, lines, and paragraphs of text). Attribute differences exist, but grouping and structural difference are not evaluated. As a consequence, the writing/drawing classification may be performed by counting correctly labeled strokes. The evaluation function may be defined as: $\tilde{E}=N_{correct}/N_{stroke}$, where $N_{correct}$ is the total number of correctly classified writing strokes and drawing strokes, and $N_{stroke}$ is the total number of strokes evaluated.

FIG. 12 contains a table for evaluating writing/drawing classification in accordance with embodiments of the invention. Note that we put non-stroke in the table for consistency with the unified framework. As any stroke cannot be a non-stroke, 0's appear at the last row and column except the bottom-right entry. One may verify that with such a table, if the nth stroke is misclassified, then the nth row of the table is all 0. Therefore, the nth row entropy is $E_{row}{}^n=\ln(N_{stroke}+1)$, and the contribution of this row to the final evaluation function is 0. If the nth stroke is correctly classified, then the nth row of the table will have one 1. Therefore the nth row entropy is $E_{row}{}^n=0$, and the contribution of this row to the final evaluation function is 1. These principles also apply to the nth column. Finally, the evaluation function becomes: $E=2(N_{correct}+1)$. It differs in constants from $\tilde{E}$ defined above, given the evaluation data set. This typically does not affect the parameter optimization.

Similarly, if we deem that writing and drawing strokes are two components, we may build two tables similar to the table of FIG. 12. One table may be for writing, and the other table may be for drawing strokes. Then the evaluation function will be the number of correctly classified writing (or drawing) strokes in the labeled writing (or drawing) strokes, up to some constants.

C. Table Detection

A table may have two components: frame lines and cells. Therefore, two tables may be filled in: one for frame lines, and the other for cells. As there is a structural relationship between the frame lines, we choose the set of frame lines for comparison. As for cells, whose inter-relationship is implied by their groupings, we may compare each cell. The definitions of two such tables are shown in FIGS. 13 and 14.

D. List Detection

A list may have two components: bullet points and list items. Therefore, there may be two tables to fill in: one for bullet points; and the other for list items. The definitions of the two such tables are shown in FIGS. 15 and 16.

VII. Searching Algorithms

As there may be many parameters to tune, the parameter space usually has a relatively high dimension (e.g., greater than 100). A full search over such a high-dimensional space to find an optimal parameter is typically impracticable. Here we propose two approaches, grid searching and a genetic algorithm, which are both more efficient than a full search.

A. Grid Searching

Suppose the parameter space is of N dimensions, i.e., there are N parameters, $\{p_i\}_{i=1,\ldots,N}$, to tune. For each parameter to be tuned, a grid searching method in accordance with embodiments of the invention fixes N−1 parameters and optimizes the remaining one parameter. Put mathematically, suppose the evaluation function is $E(p_1, p_2, \ldots, p_N)$, then the algorithm can be described as:

1. Choose initial parameters $\{p_i^{(0)}\}_{i=1,\ldots,N}$ and set k=0;
2. For i=1 to N $$p_i^{(k+1)}=\mathrm{argmax}_{p_i} E(p_1^{(k+1)},\ldots,p_{i-1}^{(k+1)},p_i,p_{i+1}^{(k)},\ldots,p_N^{(k)}).$$

3. k=k+1;
4. Loop 2 and 3 until no significant change occurs in the evaluation function.
5. Return $P_{opt}=\{p_1^{(k)},\ldots,p_N^{(k)}\}$.

The grid searching method is particularly effective when the evaluation function is convex (e.g., when there is only one maximum). When the evaluation function is not convex, the parameters may stick to a local maximum.

B. Genetic Algorithm

A genetic algorithm in accordance with embodiments of the invention is useful when the parameter space is a high-dimensional space and the evaluation function is non-convex. It is proven in theory that such a genetic algorithm can achieve a global maximum at a probability of 1.

The genetic algorithm simulates the "survival of the fittest" evolutionary process in which the fittest individuals in a population survive. In the context of the genetic algorithm, it is the individuals with the most favorable evaluation values that survive. A genetic algorithm in accordance with embodiments of the invention may be modified relative to a standard genetic algorithm. For instance, a genetic algorithm in accordance with embodiments of the invention may be described as below:

1. Generate initial population $P^{(0)}=\{I_i^{(0)}\}_{i=1,\ldots,I}$, where $I_i^{(0)}$ is an individual, and set k=0;
2. Compute $E(I_i^{(k)})$ i=1, ..., I.
3. Sort $E(I_i^{(k)})$, i=1, ..., I, from large to small and assign probabilities to the individuals according to their positions in the sequence.
4. Select two individuals from $P^{(k)}$ according to the probabilities;
5. Recombine the individuals to produce two off-springs $\tilde{I}_1$ and $\tilde{I}_2$;

6. Compute $E(\tilde{I}_1)$ and $E(\tilde{I}_2)$;
7. Add $\tilde{I}_1$ and $\tilde{I}_2$ to the new population $P^{(k+1)}$;
8. Loop steps 3~7 until the number of individuals in $P^{(k+1)}$ reaches I.
9. Replace $P^{(k)}$ with $P^{(k+1)}$ except the "best" individual that has the highest evaluation value.
10. k=k+1;
11. Loop 3~10 until the maximum allowable number of iterations is reached.
12. Return $P_{opt}=\arg\max_{I_i \in P} E(I_i)$.

Each individual is a "chromosome," which, in this case, is a collection of the N parameters.

Recombination may include two operations: crossover and mutation. Crossover takes two parent chromosomes and produces one offspring chromosome, each parameter of which is from either the first or second parent chromosomes. Crossover may not always be invoked. Crossover may be applied with a probability $p_c$. If crossover is not applied, the offspring is the duplicate of either of the selected parent chromosomes. Mutation may be applied to each offspring after the crossover. Mutation adds a random variable that may be uniformly distributed on [−d, d] to substantially every parameter with a relatively small probability $p_m$. The amount of d may be controlled so that the altered value will not exceed the maximum and minimum possible values of each parameter.

In accordance with embodiments of the invention, the following set of values may be used for performing a genetic algorithm: number of individuals in a population: I=32; crossover probability: $p_c$=0.8; mutation probability: $p_m$=0.1; maximum number of iterations: K=1000. As will be apparent, other suitable values may also be used.

VII. Concluding Remarks

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer-implemented system that generates a set of parsing-engine parameters that optimizes an ink parser's performance, the system comprising:
   a plurality of evaluator modules that each evaluates at least one evaluation function to generate an evaluation of how well parsing results output by a parsing engine match corresponding labeled results, wherein the evaluation of how well a parsing result output by a parsing engine matches a corresponding labeled results expresses a plurality of differences between the parsing results and the labeled results, the differences including: grouping difference being different grouping of ink components, structural difference being different relationships among ink components, and attribute difference being different attributes associated with ink components; and
   a searcher module that obtains from each of the plurality of evaluator modules the evaluations of how well the parsing results output by the parsing engines match the corresponding labeled results, wherein the searcher module generates a set of parsing-engine parameters that is based on the plurality of evaluations obtained from the plurality of evaluator modules such that the set of parsing-engine parameters optimizes an ink parser's performance.

2. The system of claim 1, wherein the parsing engine is a writing parser and words, lines, and paragraphs are each considered to be groups of strokes and are each evaluated according to a number of common strokes between the parsed results and the labeled results.

3. The system of claim 1, wherein the parsing engine classifies ink as either writing or drawing by counting correctly labeled strokes.

4. The system of claim 1, wherein the parsing engine detects tables by comparing cells and sets of frame lines from the parsed results with cells and sets of frame lines, respectively, from the labeled results.

5. The system of claim 1, wherein the parsing engine detects lists by comparing bullet points and list items from the parsed results with bullet points and list items, respectively, from the labeled results.

6. The system of claim 1, wherein the evaluation of how well parsing results output by a parsing engine match corresponding labeled results uses a likelihood to indicate how likely it is that parsing results match labeled results.

7. The system of claim 6, wherein the evaluation of how well parsing results output by a parsing engine match corresponding labeled results does not assign one-to-one correspondence between components of the parsing results and components of the labeled results.

8. The system of claim 1, wherein the evaluator modules notify the searcher module when they are available to evaluate an evaluation function.

9. The system of claim 1, wherein, for each parameter of the set of parsing-engine parameters, the searcher module performs grid searching by setting N−1 parameters to constant values and optimizing a remaining parameter.

10. The system of claim 1, the searcher module performs a genetic algorithm that selects parameters with relatively more favorable evaluation values and rejects parameters with relatively less favorable evaluation values.

11. A computer storage media storing computer executable instructions for selecting an optimal set of ink-parser parameters by performing steps comprising
   (1) Generating an initial population $P^{(0)}=\{I_i^{(0)}\}_{i=1,\ldots,I}$, where $I_i^{(0)}$ is an individual, and set k=0;
   (2) Computing $E(I_i^{(k)})$, i=1, . . . , I;
   (3) Sorting $E(I_i^{(k)})$, i=1, . . . , I, from large to small and assigning probabilities to the individuals according to their positions in the sequence;
   (4) Selecting two individuals from $P^{(k)}$ according to the selected individuals' probabilities;
   (5) Recombining the individuals to produce two offsprings $\tilde{I}_1$ and $\tilde{I}_2$;
   (6) Computing $E(\tilde{I}_1)$ and $E(\tilde{I}_2)$;
   (7) Adding $\tilde{I}_1$ and $\tilde{I}_2$ to a new population $P^{(k+1)}$;
   (8) Repeating steps (3) through (7) until the number of individuals in $P^{(k+1)}$ reaches I;
   (9) Replacing $P^{(k)}$ with $P^{(k+1)}$ except for a most favorable individual that has a highest evaluation value;
   (10) Computing k=k+1;
   (11) Repeating steps (3) through (10) until a maximum allowable number of iterations is reached; and
   (12) Generating an optimal set of ink-parser parameters by computing $P_{opt}=\arg\max_{I_i \in P} E(I_i)$.

12. A method comprising: generating, by a system configured to provide ink-parser-parameter optimization, a plurality of groups of parameters;
   parsing, by the system, one or more inks with different groups of parameters;
   evaluating, by the system, at least one evaluation function to generate an evaluation of how well parsing results output by the system match corresponding labeled results, wherein the evaluation of how well a parsing result output matches a corresponding labeled results expresses a plurality of differences between the parsing results and the labeled results, the differences including: grouping difference being different grouping of ink components, structural difference being different relationships among ink components, and attribute difference being different attributes associated with ink components;

using, by the device, a likelihood to indicate how likely it is that parsing results match label results, wherein:

the evaluating comprises:

performing, by the device, at least two or more algorithms that select parameters with relatively more favorable evaluation values and rejects parameters with relatively less favorable evaluation values, the at least two or more algorithms including a grid searching algorithm and a genetic algorithm.

* * * * *